UNITED STATES PATENT OFFICE.

THOMAS A. EDISON, OF NEWARK, NEW JERSEY, ASSIGNOR TO HIMSELF AND GEORGE HARRINGTON, OF WASHINGTON, D. C.

IMPROVEMENT IN SOLUTIONS FOR CHEMICAL TELEGRAPHS.

Specification forming part of Letters Patent No. 168,466, dated October 5, 1875; application filed January 26, 1875.

CASE 106.

*To all whom it may concern:*

Be it known that I, THOMAS A. EDISON, of Newark, in the county of Essex and State of New Jersey, have invented an Improvement in Preparing Paper for Chemical Telegraphs, of which the following is a specification:

I have found that if a protosalt of iron be combined with vegetable astringents, such as tannin or its derivatives, gallic or pyrogallic acid, scarcely any coloration follows; but if a piece of paper be moistened with this solution and placed under the recording-point, the nascent oxygen due to electrolysis raises the protosalt of iron to a higher oxide, with which the vegetable astringents combine to form intense inky compounds. The addition of nitrate of ammonia, or any salt which does not precipitate, increases the delicacy of the reaction, by reducing the resistance of the paper. The addition of a vegetable acid, such as oxalic acid, also increases the delicacy. I prefer to use a platina decomposing-point. It does not matter what the proportions of the various substances are as long as they are in excess of that necessary to produce the full amount of reaction. I prefer to use protochloride of iron, pyrogallic acid, nitrate of ammonia, and oxalic acid.

I claim—

In a chemical solution for telegraphic paper, the combination of a protosalt of iron with a vegetable astringent and a conducting salt, substantially as set forth, in order that the mark may be made by electrolysis, as set forth.

Signed by me this 18th day of January, A. D. 1875.

THOS. A. EDISON.

Witnesses:
 GEO. T. PINCKNEY,
 CHAS. H. SMITH.